US009796025B2

(12) United States Patent
Hori et al.

(10) Patent No.: US 9,796,025 B2
(45) Date of Patent: Oct. 24, 2017

(54) MAIN SPINDLE DEVICE OF MACHINE TOOL

(71) Applicant: JTEKT Corporation, Osaka-shi (JP)

(72) Inventors: Nobumitsu Hori, Ichinomiya (JP); Kunimichi Nakashima, Anjo (JP); Yoshihiro Arai, Kariya (JP); Toshiyuki Tsuzuki, Anjo (JP); Tetsuro Furuhata, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/861,164

(22) Filed: Sep. 22, 2015

(65) Prior Publication Data

US 2016/0096227 A1    Apr. 7, 2016

(30) Foreign Application Priority Data

Oct. 3, 2014    (JP) .................................. 2014-205001

(51) Int. Cl.
  *B23B 31/26*    (2006.01)
  *B23Q 17/00*    (2006.01)
  *B23B 31/30*    (2006.01)

(52) U.S. Cl.
  CPC .......... *B23B 31/302* (2013.01); *B23B 31/261* (2013.01); *B23Q 17/005* (2013.01); *B23B 31/26* (2013.01); *B23B 2231/26* (2013.01); *B23B 2231/50* (2013.01); *B23B 2270/025* (2013.01)

(58) Field of Classification Search
  CPC ....... B23B 31/26; B23B 31/261; B23B 31/24; B23B 31/302; B23Q 17/005; Y10T 409/309464
  See application file for complete search history.

(56) References Cited

U.S. PATENT DOCUMENTS

| | | | | |
|---|---|---|---|---|
| 3,118,345 A | * | 1/1964 | Bullard et al. | ........ B23B 31/268 409/233 |
| 3,908,383 A | * | 9/1975 | Selden | ................... B23B 31/302 279/4.02 |
| 4,411,568 A | * | 10/1983 | Rohm | ................... B23B 31/265 408/239 R |

(Continued)

FOREIGN PATENT DOCUMENTS

DE    3726305 A1 *    3/1989    ........... B32B 31/261
JP    2008-246610    10/2008

*Primary Examiner* — Sunil K Singh
*Assistant Examiner* — Ryan Rufo
(74) *Attorney, Agent, or Firm* — Oblon, McClelland, Maier & Neustadt, L.L.P.

(57) ABSTRACT

A main spindle device includes: a main spindle; a rod accommodated in the main spindle, the rod being capable of moving to an unclamp position in a direction toward the first end, and when the main spindle is holding a tool, being capable of moving to a clamp position in a direction toward a second end; a biasing unit that biases the rod in the direction toward the second end with respect to the main spindle and that biases the rod to the clamp position when a collet is holding the tool; and a biasing force detector that detects a biasing force of the biasing unit which biases the rod in the direction toward the second end after the rod is moved in the direction toward the first end with respect to the main spindle to the unclamp position by force larger than the biasing force of the biasing unit.

8 Claims, 12 Drawing Sheets

(56) References Cited

U.S. PATENT DOCUMENTS

| | | | | |
|---|---|---|---|---|
| 4,708,547 | A | * | 11/1987 | Baron .................... B23B 31/265 409/233 |
| 5,039,261 | A | * | 8/1991 | Takada .................. B23B 31/263 279/4.06 |
| 5,096,347 | A | * | 3/1992 | Kumagai .............. B23B 31/265 408/239 A |
| 2001/0048858 | A1 | * | 12/2001 | Akamatsu .......... G05B 19/4065 409/134 |
| 2002/0013639 | A1 | * | 1/2002 | Fujishima .............. B23Q 41/08 700/175 |
| 2004/0074074 | A1 | * | 4/2004 | Kikkawa .............. B23Q 1/0018 29/402.08 |
| 2009/0053005 | A1 | * | 2/2009 | Kikkawa ............... B23B 31/265 409/231 |
| 2010/0119320 | A1 | * | 5/2010 | Inoue .................. B23Q 17/003 409/233 |
| 2011/0081216 | A1 | * | 4/2011 | Ogura .................... B23Q 1/265 409/141 |

\* cited by examiner

MAIN SPINDLE DEVICE OF MACHINE TOOL

INCORPORATION BY REFERENCE

The disclosure of Japanese Patent Application No. 2014-205001 filed on Oct. 3, 2014 including the specification, drawings and abstract, is incorporated herein by reference in its entirety.

BACKGROUND OF THE INVENTION

1. Field of the Invention

The present invention relates to main spindle devices of machine tools.

2. Description of the Related Art

Main spindle devices of machine tools that machine a workpiece with a changeable rotary tool such as a machining center typically have a housing, a main spindle, a rod, and a piston. The main spindle is supported so as to be rotatable with respect to the housing. The rod is accommodated in the main spindle and is supported so as to be able to reciprocate in an axial direction of the main spindle. A collet that holds and releases a tool attached to the distal end (first end) of the main spindle is mounted on the distal end (first end) of the rod, and the rod is biased in a direction toward the rear end (second end) with respect to the main spindle by a plurality of disc springs. When the rod is biased by the disc springs and move to a clamp position in the direction toward the rear end, the rod pulls the tool being held by the collet in the direction toward the rear end, so that the tool is fixed to the distal end of the main spindle. The piston is disposed on the rear end side with respect to the rod so as to be slightly separated from the rear end of the rod. When the tool is changed or removed, the piston is used to move the rod in the direction toward the distal end by force larger than the biasing force of the disc springs. When the rod is moved to an unclamp position in the direction toward the distal end with respect to the main spindle, the collet releases the tool so that the tool can be changed or removed.

In such a main spindle device of a machine tool, the biasing force of the disc springs greatly affects the force supporting the tool. A decrease in biasing force of the disc springs due to their deterioration therefore greatly affects machining accuracy etc. If the operator machines workpieces without noticing such a decrease in biasing force of the disc springs, defective products may be produced as the workpieces are not machined with desired machining accuracy, or abnormality may occur during machining, stopping the machine tool for a long time. Accordingly, in production sites using such main spindle devices of machine tools, the biasing force of the disc springs is regularly checked and the disc springs are replaced before they reach the end of their life.

Checking the biasing force of disc springs is a very laborious task. Conventionally, a clamping force measuring gauge TK (see FIG. 17) or TR (see FIG. 18) that looks similar to a normal tool T shown in FIG. 16 is attached to the distal end of the main spindle instead of the tool T, and the biasing force of the disc springs is measured with the clamping force measuring gauge TK, TR. The clamping force measuring gauge TK shown in FIG. 17 has an accommodated portion TK1 that is to be accommodated in the main spindle and a protruding portion TK2 that is to protrude from the main spindle. The accommodated portion TK1 has substantially the same shape as that of the tool T. However, the protruding portion TK2 has a mechanical configuration and an electronic circuit for measuring the biasing force, a display unit, etc. The protruding portion TK2 therefore has a significantly different shape from that of the tool T and is much heavier than the tool T. The clamping force measuring gauge TR shown in FIG. 18 wirelessly transmits the measurement result etc. to a wireless unit TRC, and has an accommodated portion TR1 that is to be accommodated in the main spindle and a protruding portion TR2 that is to protrude from the main spindle. The accommodated portion TR1 has substantially the same shape as that of the tool T. However, the protruding portion TR2 has a mechanical configuration and an electronic circuit for measuring the biasing force, an electronic circuit for transmission, etc. The protruding portion TR2 therefore has a significantly different shape from that of the tool T and is much heavier than the tool T. Accordingly, when being attached to or detached from the main spindle by an automatic tool changer etc., the clamping force measuring gauge TK, TR may not be able to be appropriately attached to or detached from the main spindle. The expensive clamping force measuring gauge TK, TR may therefore drop and break.

Japanese Patent Application Publication No. 2008-246610 (JP 2008-246610 A) discloses a main spindle device of a machine tool in which a pressure sensor that detects a pressing force applied to press a rod to an unclamp position is attached to the distal end of a piston, and a rod displacement detector that detects displacement of the rod is provided in a housing. The main spindle device disclosed in JP 2008-246610 A presses the rod located at a clamp position in a direction toward the unclamp position by the piston and obtains the clamping force of a collet based on the pressing force of the piston and the displacement of the rod to determine if it is time to replace disc springs.

Ideal springs have linear characteristics having a linear relationship between the load and the deflection. However, actual springs (especially disc springs) do not have ideal linear characteristics, but have nonlinear characteristics with hysteresis as shown by load-deflection characteristics in FIG. 6. In the load-deflection characteristics shown in FIG. 6, a load Fa is a load corresponding to deflection Pc in the case where the load is gradually increased from zero, and a load Fb is a load corresponding to deflection PC in the case where the load is gradually reduced after being increased from zero to the load corresponding to deflection Pa. Due to the hysteresis, the load corresponding to the same deflection Pc (PC) varies depending on whether the deflection is increased from zero (no load) or the deflection is reduced from the large deflection Pa. In the load-deflection characteristics shown in FIG. 6, a path in which the load is gradually increased from zero to the load corresponding to the deflection Pa is referred to as the "forward path," and a path in which the load is gradually reduced from the load corresponding to the deflection Pa to zero is referred to as the "return path."

In the case of the main spindle devices of the machine tools, a load is applied to the disc springs by the piston until the rod reaches the unclamp position corresponding to the deflection Pa in the load-deflection characteristics shown in FIG. 6. The rod is then gradually moved in a direction toward the clamp position by the biasing force of the disc springs, and the tool is held clamped with the rod being located at the clamp position corresponding to the deflection PC. In order to obtain the biasing force of the disc springs in the main spindle devices of the machine tools, the load (load Fb) corresponding to the deflection PC in the return path of the load-deflection characteristics in FIG. 6 needs to be obtained rather than the load (load Fa) corresponding to the deflection Pc in the forward path thereof.

However, the main spindle device described in JP 2008-246610 A obtains the load (load Fa) corresponding to the deflection Pc in the forward path of the load-deflection characteristics shown in FIG. 6. The main spindle device described in JP 2008-246610 A therefore obtains the load larger than the load (load Fb) to be actually obtained. In this case, since the actual load (load Fb) of the disc springs when the tool is clamped is smaller than the obtained load (Fa), the time to replace the disc springs may have already passed, which is not preferable.

SUMMARY OF THE INVENTION

It is one object of the present invention to provide a main spindle device of a machine tool which can more accurately measure the biasing force of a biasing unit such as disc springs for clamping a tool without using a clamping force measuring gauge.

According to one aspect of the present invention, a main spindle device of a machine tool includes: a main spindle supported so as to be rotatable relative to a housing and having a first end to which a tool is attached; a rod accommodated in the main spindle so as to be coaxial therewith and capable of reciprocating in an axial direction with respect to the main spindle, the rod being capable of moving to an unclamp position where the tool is released in a direction toward the first end, and when the main spindle is holding the tool, being capable of moving to a clamp position where the tool is clamped in a direction toward a second end of the main spindle; a collet that is attached to a first end of the rod, that holds the tool when the rod moves in the direction toward the second end with respect to the main spindle, and that releases the tool when the rod moves in the direction toward the first end with respect to the main spindle; a biasing unit that biases the rod in the direction toward the second end with respect to the main spindle and that biases the rod to the clamp position when the collet is holding the tool; and a biasing force detector that detects a biasing force of the biasing unit which biases the rod in the direction toward the second end after the rod is moved in the direction toward the first end with respect to the main spindle to the unclamp position by force larger than the biasing force of the biasing unit.

Since the main spindle device of the above aspect obtains the biasing force of the biasing unit which biases the rod in the direction toward the second end after the rod is moved to the unclamp position, the main spindle device of the above aspect can appropriately obtain a load in the return path of the load-deflection characteristics shown in FIG. 6. The main spindle device of the above aspect can therefore more accurately measures the biasing force of the biasing unit without using a clamping force measuring gauge.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

First to third embodiments as modes for carrying out the invention will be described below with reference to the accompanying drawings.

Figure 1:
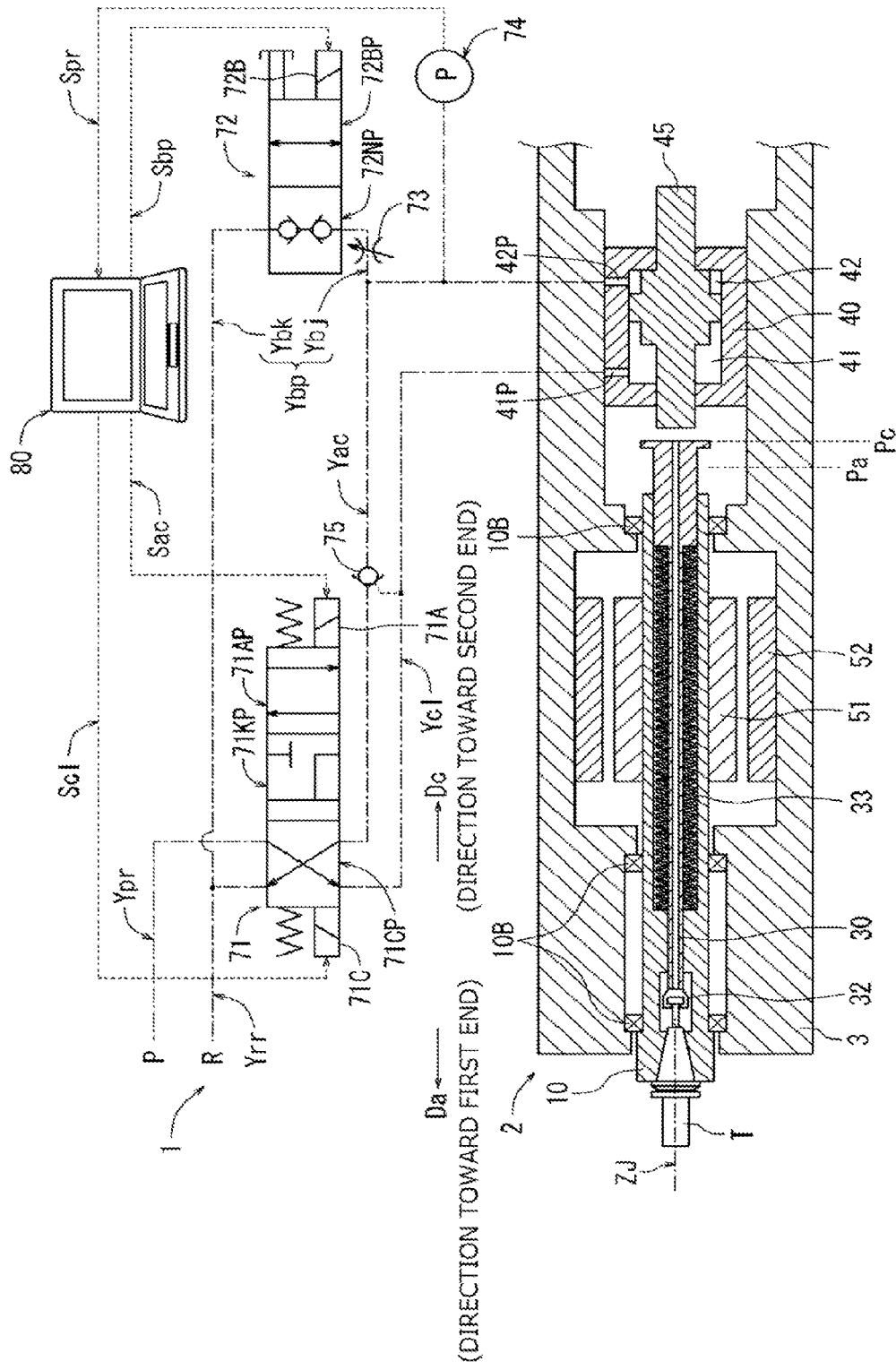
FIG. 1 is a diagram illustrating the general configuration of a main spindle device of a machine tool according to a first embodiment.

As shown in FIG. 1, a main spindle device 1 (a main spindle device of a machine tool) of the first embodiment has a main spindle unit 2, a switch valve 71, a bypass valve 72, a variable throttle 73 (corresponding to the throttle), a pressure detector 74, a pilot check valve 75, a controller 80, etc. The main spindle unit 2 has a housing 3, a main spindle 10, a rod 30, a collet 32, a disc spring 33 (corresponding to the biasing unit), a cylinder 40, a piston 45, a rotor 51, a stator 52, etc. In FIG. 1, a supply path Ypr is a path through which hydraulic oil having a predetermined pressure is supplied, and a discharge path Yrr is a path through which hydraulic oil is discharged and collected to an oil pan. An end P of the supply path Ypr is connected to a supply source of hydraulic oil having the predetermined pressure, and an end R of the discharge path Yrr is connected to the oil pan that collects hydraulic oil, etc.

The main spindle 10 is supported by bearings 10B so as to be rotatable relative to the housing 3, and a tool T is attached to a first end of the main spindle 10. The main spindle 10 has a substantially cylindrical shape in order to accommodate the rod 30 described below. The main spindle 10 is driven by a rotational driving force generated by the rotor 51 and the stator 52 so as to rotate together with the tool T and the rod 30 about a rotation axis ZJ.

The rod 30 is accommodated in the main spindle 10 so as to be coaxial therewith. The rod 30 can reciprocate in an axial direction with respect to the main spindle 10 and can move to an unclamp position Pa in a direction toward the first end. The unclamp position Pa is the position where the tool T is released. When the main spindle 10 is holding the tool T, the rod 30 can move to a clamp position Pc in a direction toward a second end of the main spindle 10. The clamp position Pc is the position where the tool T is clamped. When the main spindle 10 is not holding the tool T, the rod 30 can move beyond the clamp position Pc in the direction toward the second end.

The collet 32 is attached to a first end of the rod 30. When the rod 30 moves in the direction toward the second end with respect to the main spindle 10 (moves to the clamp position Pc), the collet 32 holds the tool T attached to the first end of the main spindle 10 and pulls the tool T in the direction toward the second end to fix (clamp) the tool T to the first end of the main spindle 10. When the rod 30 moves toward the first end with respect to the main spindle 10 (moves to the unclamp position Pa), the collet 32 releases (unclamps) the tool T.

The disc spring 33 is the biasing unit. The disc spring 33 biases the rod 30 in the direction toward the second end with respect to the main spindle 10. When the collet 32 is holding the tool T, the disc spring 33 biases the rod 30 to the clamp position Pc. A plurality of the disc springs 33 are disposed in spring accommodating space surrounded by the inner peripheral surface of the main spindle 10 and the outer peripheral surface of the rod 30.

The piston 45 is accommodated in the cylinder 40 and is provided on the second end side with respect to the rod 30. The piston 45 can reciprocate in the axial direction with respect to the main spindle 10 and is disposed coaxially with the main spindle 10. When the piston 45 moves in the direction toward the first end with respect to the main spindle 10, the piston 45 contacts a second end of the rod 30 and moves the rod 30 to the unclamp position Pa by force larger than the biasing force of the disc springs 33 (see FIG. 3). When the piston 45 moves in the direction toward the second end with respect to the main spindle 10, the piston 45 is separated from the rod 30 (see FIG. 2).

The cylinder 40 is fixed to the housing 3 at a position on the second end side with respect to the main spindle 10 and the rod 30 and accommodates the piston 45. The cylinder 40 has an unclamp chamber 42 and a clamp chamber 41. The unclamp chamber 42 is a chamber that is filled with hydraulic oil having the predetermined pressure through the supply path Ypr when the piston 45 moves in the direction toward the first end with respect to the main spindle 10. The clamp chamber 41 is a chamber that is filled with hydraulic oil having the predetermined pressure through the supply path Ypr when the piston 45 moves in the direction toward the second end with respect to the main spindle 10. The cylinder 40 has communication holes 42P, 41P. The communication hole 42P allows the unclamp chamber 42 to communicate with an unclamp path Yac, and the communication hole 41P allows the clamp chamber 41 to communicate with a clamp path Ycl.

The unclamp path Yac is a path that is connected to the unclamp chamber 42 via the communication hole 42P to fill the unclamp chamber 42 with hydraulic oil or to discharge hydraulic oil from the unclamp chamber 42.

The clamp path Ycl is a path that is connected to the clamp chamber 41 via the communication hole 41P to fill the clamp chamber 41 with hydraulic oil or to discharge hydraulic oil from the clamp chamber 41.

The switch valve 71 is a valve capable of switching an oil passage among three ways. The switch valve 71 switches to a clamp position 71CP when a current is applied to a solenoid 71C (no current is applied to a solenoid 71A). The switch valve 71 switches to an unclamp position 71AP when a current is applied to the solenoid 71A (no current is applied to the solenoid 71C). The switch valve 71 switches to a clamping force measurement position 71KP when no current is applied to the solenoids 71A, 71C. At the clamp position 71CP, the switch valve 71 connects the clamp path Ycl to the supply path Ypr and connects the unclamp path Yac to the discharge path Yrr. At the unclamp position 71AP, the switch valve 71 connects the unclamp path Yac to the supply path Ypr and connects the clamp path Ycl to the discharge path Yrr. At the clamping force measurement position 71KP, the switch valve 71 closes the supply path Ypr and connects the clamp path Ycl, the unclamp path Yac, and the discharge path Yrr to each other. The switch valve 71 is controlled by the controller 80.

A bypass path Ybp is a path that connects the unclamp path Yac to the discharge path Yrr or connects the unclamp chamber 42 to the discharge path Yrr to guide hydraulic oil in the unclamp chamber 42 to the discharge path Yrr so as to bypass the switch valve 71. The bypass valve 72 is provided at an intermediate position in the bypass path Ybp. A part of the bypass path Ybp which extends from the unclamp path Yac (or the unclamp chamber 42) to the bypass valve 72 is herein referred to as the "upstream-side bypass path Ybj," and a part of the bypass path Ybp which extends from the bypass valve 72 to the discharge path Yrr is herein referred to as the "downstream-side bypass path Ybk."

The bypass valve 72 is disposed between the upstream-side bypass path Ybj and the downstream-side bypass path Ybk. The bypass valve 72 switches to an open position 72BP when a current is applied to a solenoid 72B. The bypass valve 72 switches to a close position 72NP when no current is applied to the solenoid 72B. The bypass valve 72 closes the bypass path Ybp when controlled to the close position 72NP, and opens the bypass path Ybp when controlled to the open position 72BP.

The variable throttle 73 is disposed at any position in the bypass path Ybp. When hydraulic oil flows into the bypass path Ybp, the variable throttle 73 adjusts the flow rate of the hydraulic oil to reduce the moving speed of the piston 45 when the biasing force of the biasing unit described below is measured. Reducing the moving speed of the piston 45 when measuring the biasing force allows a more accurate pressure to be obtained, which can further improve measurement accuracy of the biasing force.

The pressure detector 74 is a pressure sensor that detects the pressure of hydraulic oil. The pressure detector 74 is disposed at the position where the pressure detector 74 can detect at least one of the pressure of hydraulic oil in the unclamp chamber 42, the pressure of hydraulic oil in the unclamp path Yac, and the pressure of hydraulic oil in the bypass path Ybp. In the example of FIG. 1, the pressure detector 74 is connected to the upstream-side bypass path Ybj of the bypass path Ybp.

The pilot check valve 75 is disposed in the unclamp path Yac and is connected to the clamp path Ycl as shown by a dashed line in the figure. The pilot check valve 75 opens the unclamp path Yac when the pressure of hydraulic oil in the clamp path Ycl is equal to or higher than a predetermined pressure. For example, the pilot check valve 75 is opened when the clamp path Ycl is connected to the supply path Ypr. When the pressure of hydraulic oil in the clamp path Ycl is lower than the predetermined pressure, the pilot check valve 75 inhibits discharge of hydraulic oil from the unclamp chamber 42 and allows hydraulic oil to flow into the unclamp chamber 42. For example, when the unclamp path Yac is connected to the supply path Ypr, hydraulic oil flows from the supply path Ypr into the unclamp chamber 42 via the unclamp path Yac and the pilot check valve 75.

The controller 80 is a personal computer, for example. The controller 80 outputs control signals to the solenoids 71A, 71C, 72B via signal paths Sac, Scl, Sbp and receives a detection signal from the pressure detector 74 via a signal path Spr to detect a pressure. The controller 80 obtains the biasing force of the disc springs 33 at the clamp position Pc based on the detected pressure to obtain the life of the disc springs 33, time to replace the disc springs 33, etc. The controller 80 has a memory unit. The memory unit stores conversion information that is used to convert the pressure obtained by the controller 80 to the biasing force (clamping force).

Figure 2:
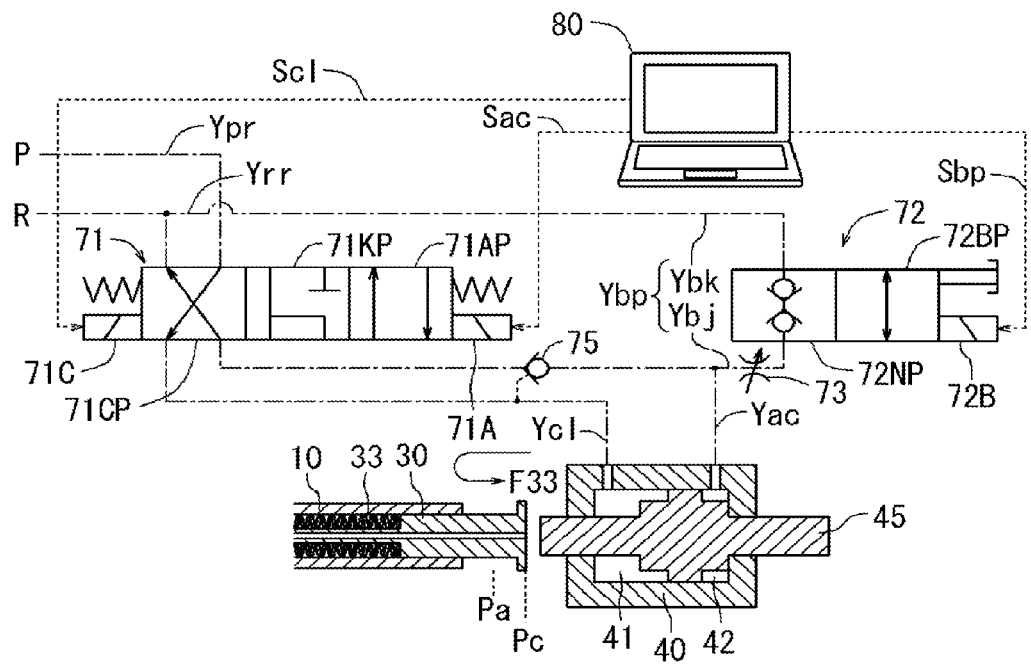
FIG. 2 is a diagram illustrating oil pressure paths and the positions of a rod and a piston in the case where a tool is clamped.

FIG. 2 is a diagram illustrating oil pressure paths and the positions of the rod 30 and the piston 45 in the case where the tool T is clamped. A current is applied to the solenoid 71C (no current is applied to the solenoid 71A), and the switch valve 71 switches to the clamp position 71CP, so that the clamp chamber 41 is filled with hydraulic oil supplied from the supply path Ypr via the clamp position 71CP and the clamp path Ycl. Hydraulic oil in the unclamp chamber 42 is discharged into the discharge path Yrr via the unclamp path Yac, the pilot check valve 75, and the clamp position 71CP. At this time, the pressure of hydraulic oil in the clamp path Ycl is equal to or higher than the predetermined pressure due to the hydraulic oil from the supply path Ypr. The pilot check valve 75 therefore opens the unclamp path Yac. No current is applied to the solenoid 72B, and the bypass valve 72 switches to the close position 72NP. No hydraulic oil therefore flows into the bypass path Ybp in the state shown in FIG. 2.

In this state, the clamp chamber 41 is filled with hydraulic oil, and hydraulic oil is discharged from the unclamp chamber 42. Accordingly, the piston 45 moves to the end of its stroke in the direction toward the second end. The piston 45 is thus separated from the rod 30. The rod 30 is therefore biased in the direction toward the second end by the disc springs 33, and is moved to the clamp position Pc in the case where the main spindle 10 has the tool T attached thereto. The biasing force of the disc springs 33 at this time is a biasing force F33 shown in FIG. 2, which corresponds to the load Fb at the clamp position Pc in the return path of the load-deflection characteristics shown in FIG. 6.

Figure 3:
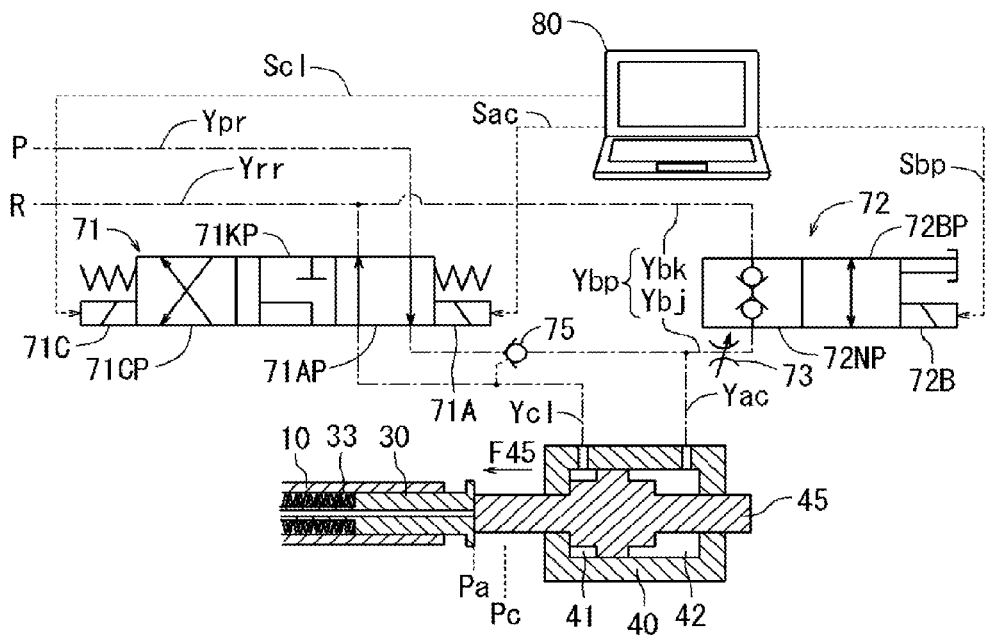
FIG. 3 is a diagram illustrating the oil pressure paths and the positions of the rod and the piston in the case where the tool is unclamped.

FIG. 3 is a diagram illustrating the oil pressure paths and the positions of the rod 30 and the piston 45 in the case where the tool T is unclamped. A current is applied to the solenoid 71A (no current is applied to the solenoid 71C), and the switch valve 71 switches to the unclamp position 71AP. The unclamp chamber 42 is filled with hydraulic oil supplied from the supply path Ypr via the unclamp position 71AP, the pilot check valve 75, and the unclamp path Yac. Hydraulic oil in the clamp chamber 41 is discharged into the discharge path Yrr via the clamp path Ycl and the unclamp position 71AP. At this time, hydraulic oil flows from the supply path Ypr into the unclamp path Yac and flows into the unclamp chamber 42 through the pilot check valve 75. No current is applied to the solenoid 72B, and the bypass valve 72 switches to the close position 72NP. No hydraulic oil therefore flows into the bypass path Ybp in the state shown in FIG. 3.

In this state, the unclamp chamber 42 is filled with hydraulic oil, and hydraulic oil is discharged from the clamp chamber 41. Accordingly, the piston 45 moves to the end of its stroke in the direction toward the first end. The piston 45 thus moves (presses) the rod 30 in the direction toward the first end to the unclamp position Pa by force F45 larger than the biasing force of the disc springs 33. The load on the disc springs 33 at this time corresponds to the load at the clamp position Pa in the forward path of the load-deflection characteristics shown in FIG. 6.

When measuring the clamping force that is produced by the biasing force of the disc springs 33, the controller 80 first controls the switch valve 71 and the bypass valve 72 to move the rod 30 to the unclamp position Pa by the piston 45 as shown in FIG. 3, in response to a command to measure the biasing force. For example, the controller 80 may be pre-programmed to measure the biasing force first thing in the morning of an operating day (e.g., at seven in the morning immediately before operation is started) or may be programmed to wait for command input by the operator. With this operation, a load is applied until the unclamp position Pa is reached in the forward path of the load-deflection characteristics shown in FIG. 6.

Figure 4:
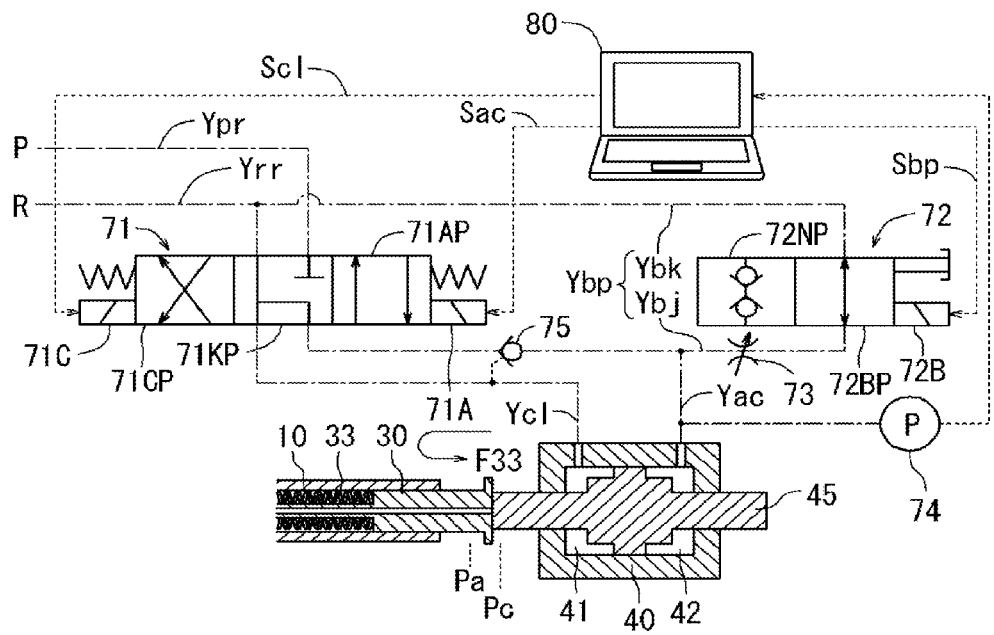
FIG. 4 is a diagram illustrating the oil pressure paths and the positions of the rod and the piston at the time of measuring the biasing force of a biasing unit.

As shown in FIG. 4, the controller 80 then switches the switch valve 71 to the clamping force measurement position 71KP by not applying a current to the solenoids 71A, 71C of the switch valve 71 and switches the bypass valve 72 to the open position 72BP by applying a current to the solenoid 72B of the bypass valve 72. The controller 80 thus detects the pressure with the pressure detector 74 while slowly moving the piston 45 in the direction toward the second end from the position corresponding to the end of its stroke in the direction toward the first end (the position corresponding to the unclamp position Pa) by the biasing force F33 of the disc springs 33. In the state shown in FIG. 4, the pilot check valve 75 closes the unclamp path Yac. Hydraulic oil in the unclamp chamber 42 therefore flows through the bypass path Ybp into the clamp chamber 41 via the clamping force measurement position 71KP of the switch valve 71. An excess pressure etc. in the unclamp chamber 42 is discharged through the discharge path Yrr via the bypass path Ybp. The piston 45 is slowly pressed back in the direction toward the second end from the position corresponding to the end of its stroke in the direction toward the first end (the position corresponding to the unclamp position Pa) by the rod 30 biased by the biasing force F33 of the disc springs 33. The controller 80 measures the biasing force F33 that biases the rod 30 from the unclamp position Pa toward the clamp position Pc. The controller 80 therefore measures a load in the return path of the load-deflection characteristics shown in FIG. 6.

Figure 5:
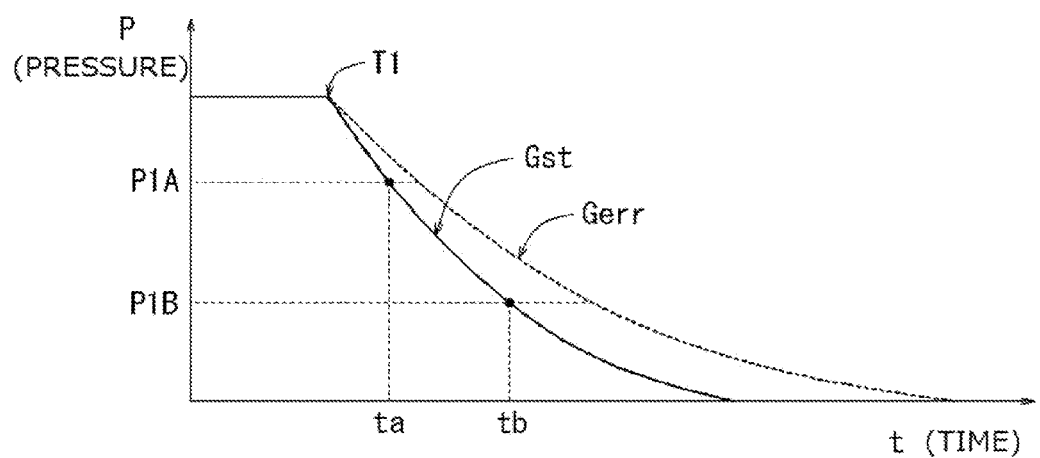
FIG. 5 is a diagram illustrating an example of measured pressures in the measurement of the biasing force of the biasing unit shown in FIG. 4.

The pressures detected at this time are as shown in time-pressure characteristics in the example of FIG. 5. If the switch valve 71 and the bypass valve 72 are switched to the state shown in FIG. 4 at timing T1, the piston 45 is gradually pressed back in the direction toward the second end, and the pressure gradually decreases. Characteristics Gst shown by a continuous line show an example of characteristics in the case where the disc springs 33 have not reached the end of their life and still have a sufficient biasing force. Characteristics Gerr shown by a dashed line show an example of characteristics in the case where the disc springs 33 have reached the end of their life and the biasing force of the disc springs 33 has decreased. The controller 80 obtains the biasing force based on the time (tb−ta) or the gradient [(P1A−P1B)/(tb−ta)] and the conversion information stored in the memory unit of the controller 80. The time (tb−ta) is the time it takes for the measured pressure to decrease from a first predetermined pressure P1A to a second predetermined pressure P1B, and the gradient [(P1A−P1B)/(tb−ta)] is the difference (P1A−P1B) between the first predetermined pressure P1A and a second predetermined pressure P1B for the time (tb−ta). For example, in the case of obtaining the biasing force based on the time (tb−ta) and the conversion information, a conversion table for converting the time to a biasing force is created and stored in advance as the conversion information. In the case of obtaining the biasing force based on the gradient [(P1A−P1B)/(tb−ta)] and the conversion information, a conversion table for converting the gradient to a biasing force is created and stored in advance as the conversion information.

Figure 6:
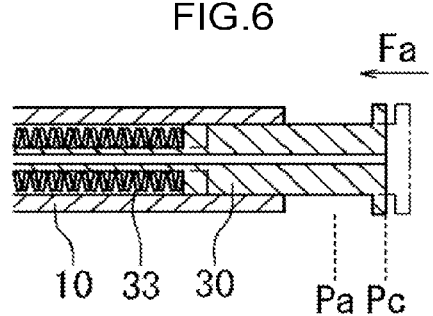
FIG. 6 is a diagram illustrating an example of load-deflection characteristics with hysteresis, namely the relationship between the load and the deflection, of the biasing unit such as disc springs.
Figure 6:
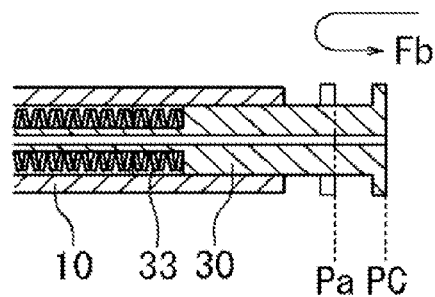
Figure 6:
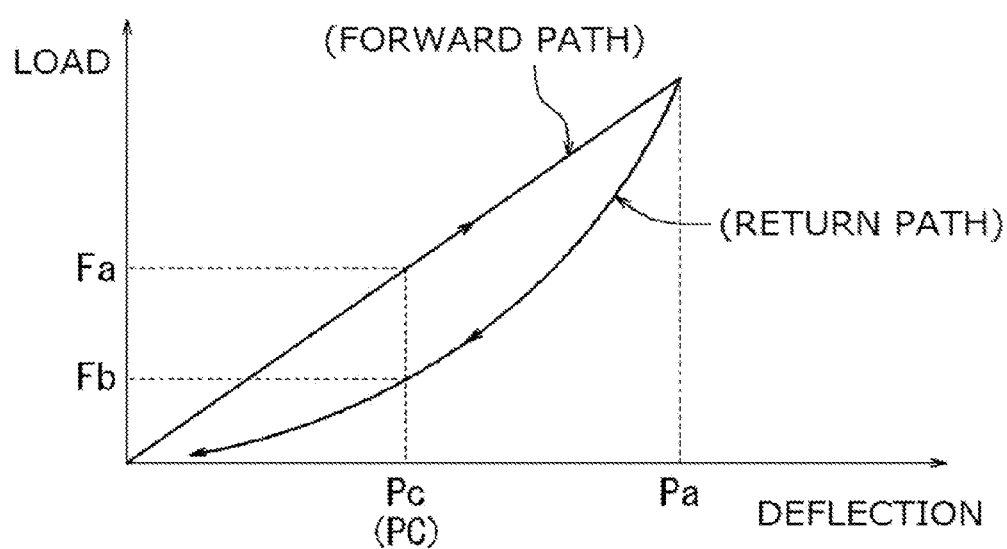

Since the main spindle device of the first embodiment obtains a load in the return path of the load-deflection characteristics shown in FIG. 6, the main spindle device of the first embodiment can more accurately measure the biasing force of the disc springs 33 as compared to the main spindle device described in JP 2008-246610 A which obtains a load in the forward path of the load-deflection characteristics shown in FIG. 6. The above configuration for obtaining the biasing force, which is the cylinder 40, the piston 45, the switch valve 71, the bypass valve 72, the pressure detector 74, the pilot check valve 75, the controller 80, the memory unit, the bypass path Ybp, etc., corresponds to the biasing force detector. Since the main spindle device of the first embodiment does not require alteration in the existing main spindle unit, the main spindle device of the first embodiment can be implemented in a very short time and at low cost as compared to the existing main spindle devices.

Figure 7:
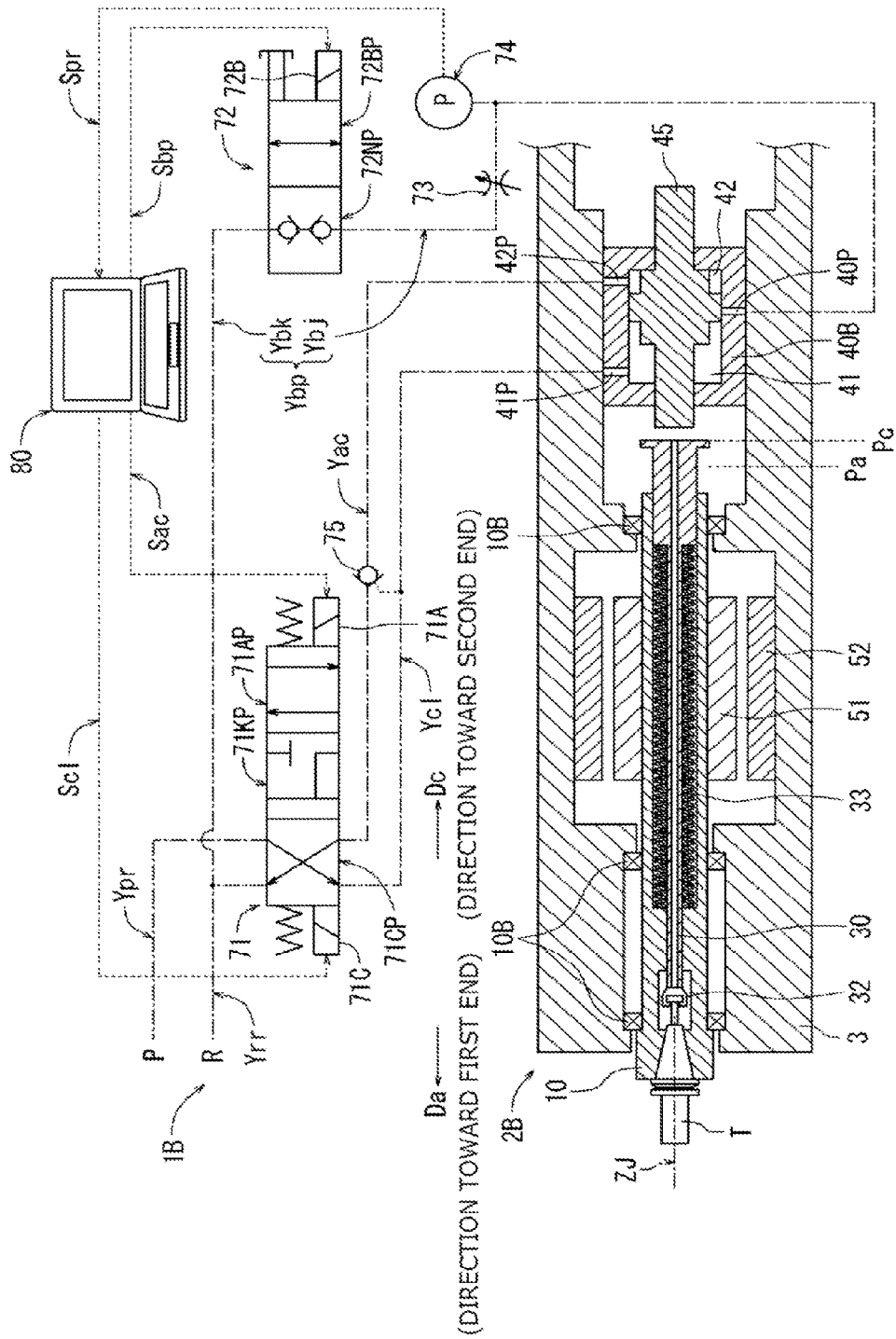
FIG. 7 is a diagram illustrating the general configuration of a main spindle device of a machine tool according to a second embodiment.

A main spindle device 1B of the second embodiment will be described with reference to FIGS. 7 to 10. The main spindle device 1B of the second embodiment shown in FIG. 7 is different from the main spindle device 1 of the first embodiment shown in FIG. 1 in the position to which the end (upstream end) on the opposite side of the upstream-side bypass path Ybj from the bypass valve 72 is connected. In the first embodiment, the upstream end of the upstream-side bypass path Ybj is connected to any position in the unclamp path Yac or the unclamp chamber 42. In the second embodiment, however, the upstream end of the upstream-side bypass path Ybj is connected to a special communication hole 40P formed at a special position in the unclamp chamber 42 of a cylinder 40B in a main spindle unit 2B. This difference will be mainly described below.

Figure 8:
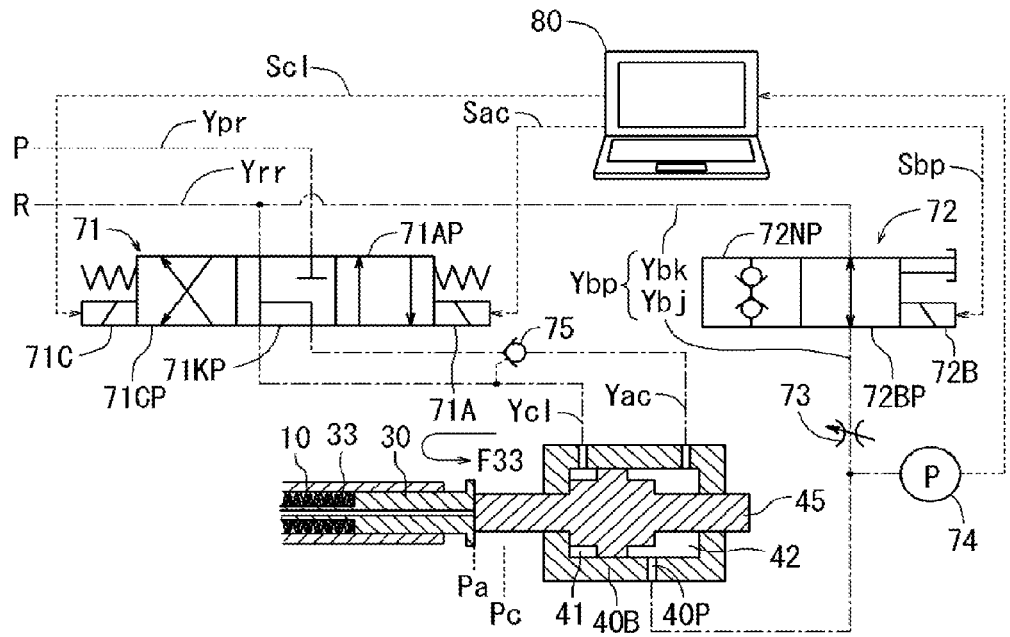
FIG. 8 is a diagram illustrating oil pressure paths and the positions of a rod and a piston at the time of measuring the biasing force of a biasing unit in the second embodiment, and illustrating the state where the rod is located at an unclamp position.

FIG. 8 shows the state where the switch valve 71 has been controlled to the clamping force measurement position 71KP and the bypass valve 72 has been controlled to the open position 72BP after moving the rod 30 to the unclamp position Pa by the piston 45 by controlling the switch valve 71 to the unclamp position 71AP and controlling the bypass valve 72 to the close position 72NP. As shown in FIG. 8, the special communication hole 40P is formed at the position where the special communication hole 40P communicates with the unclamp chamber 42 of the cylinder 40B (the position where the special communication hole 40P opens without interference from the piston 45) in the case where the piston 45 has been moved to the end of its stroke in the direction toward the first end, namely to the position corresponding to the unclamp position Pa.

Figure 9:
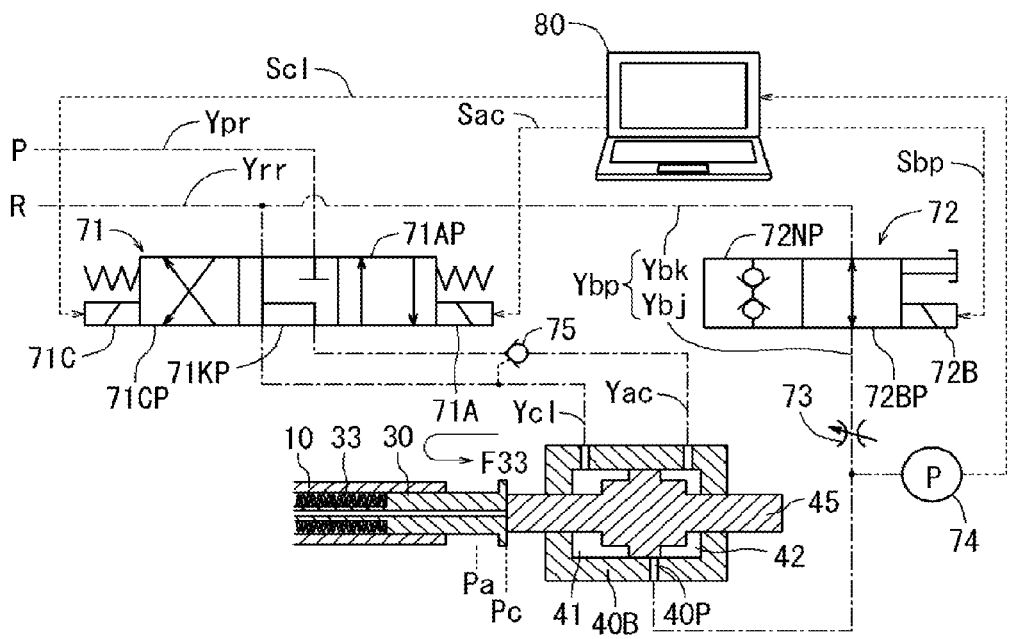
FIG. 9 is a diagram illustrating the state where the rod and the piston have moved in a direction toward a clamp position from the state of FIG. 8 and the piston has reached the clamp position.

FIG. 9 shows the state where the piston 45 is being gradually pressed back in the direction toward the second end from the state shown in FIG. 8 by the biasing force F33 from the rod 30 and the rod 30 has reached the clamp position Pc (the state where the piston 45 has reached the position corresponding to the clamp position Pc). The special communication hole 40P is formed at the position in the cylinder 40B where the special communication hole 40P is closed by the piston 45 when the rod 30 reaches the clamp position Pc (when the piston 45 reaches the position corresponding to the clamp position Pc). The controller 80 measures the biasing force F33 that biases the rod 30 from the unclamp position Pa toward the clamp position Pc. The controller 80 therefore measures a load in the return path of the load-deflection characteristics shown in FIG. 6.

Figure 10:
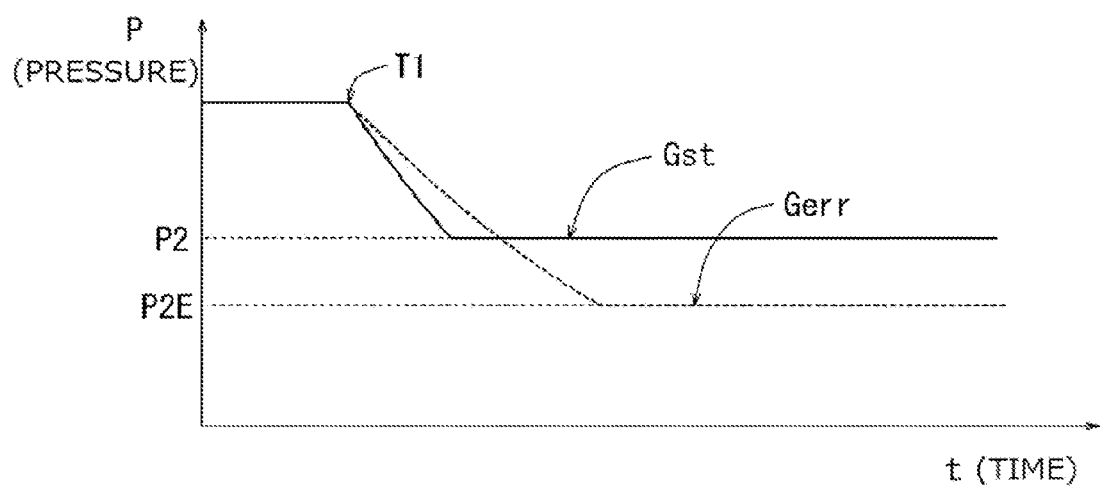
FIG. 10 is a diagram illustrating an example of measured pressures in the measurement of the biasing force of the biasing unit shown in FIGS. 8 and 9.

Time-pressure characteristics of the second embodiment are as shown in the example of FIG. 10. In the second embodiment, as in the first embodiment shown in FIG. 5, if the switch valve 71 and the bypass valve 72 are controlled to the clamping force measurement position 71KP and the open position 72BP at timing T1, the piston 45 is gradually pressed back in the direction toward the second end and the pressure gradually decreases, as shown in FIG. 9. However, the second embodiment is different from the first embodiment in that the piston 45 stops moving at the position corresponding to the clamp position Pc (as the special communication hole 40P is closed). If the piston 45 stops at the position corresponding to the clamp position Pc, a substantially constant pressure is maintained. The controller 80 obtains the biasing force based on this substantially constant pressure and the conversion information stored in the memory unit. For example, the area of the surface of the piston 45 which is subjected to the force of hydraulic oil in the unclamp chamber 42 in the direction toward the first end is stored as the conversion information. The controller 80 obtains the biasing force by multiplying the measured pressure and the area as the conversion information. In the example of FIG. 10, the disc springs whose biasing force has not decreased have characteristics Gst shown by a continuous line, and the measured pressure is a pressure P2. The disc springs whose biasing force has decreased have characteristics Gerr shown by a dashed line, and the measured pressure is a pressure P2E.

As described above, in the second embodiment, the controller 80 obtains the biasing force based on the pressure at the clamp position Pc, and thus obtains the load at the clamp position Pc in the return path of the load-deflection characteristics shown in FIG. 6. A very accurate biasing force can thus be obtained. The configuration for detecting the clamp position Pc can be simplified (no position detector is required) as compared to the third embodiment described below.

Figure 11:
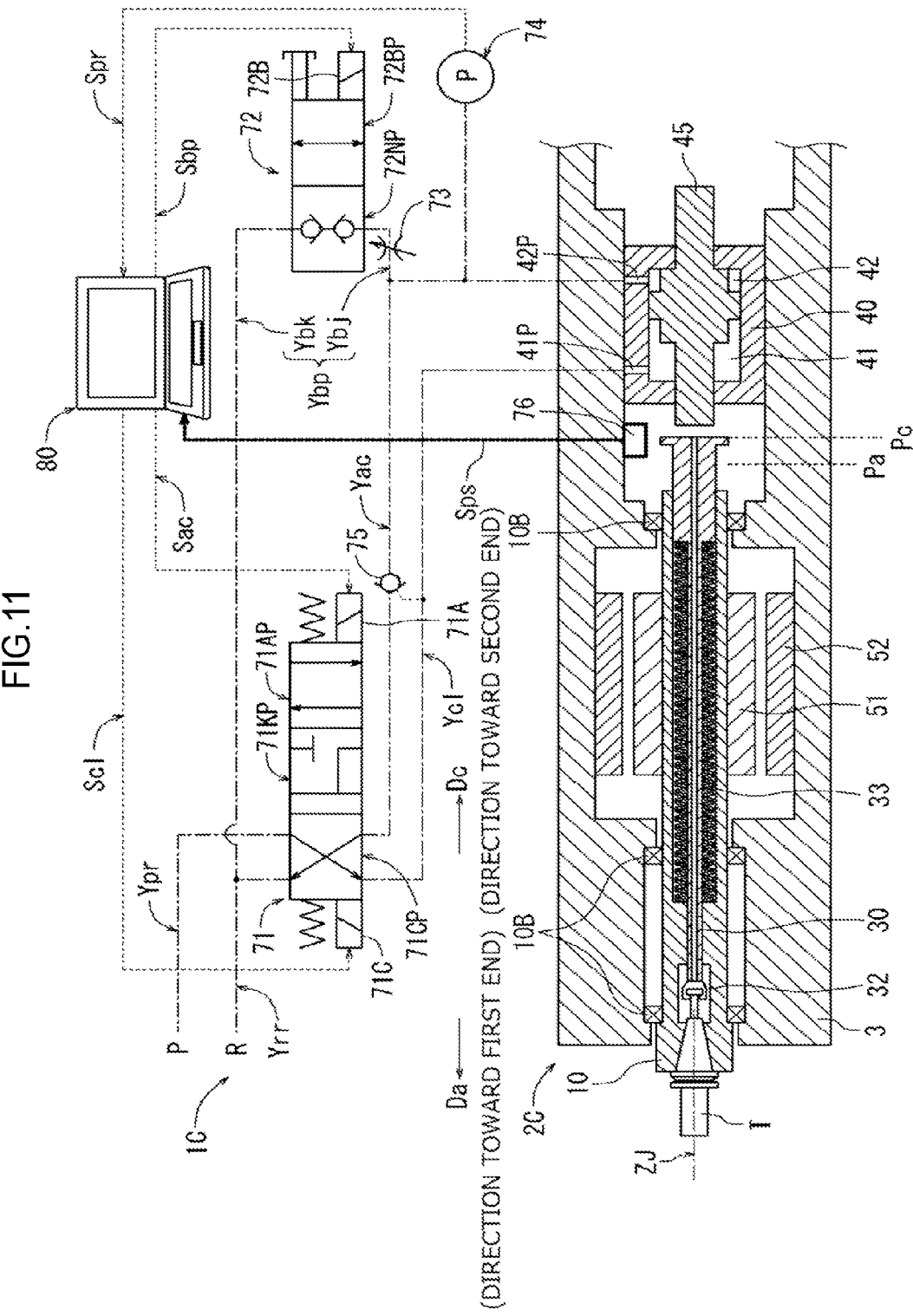
FIG. 11 is a diagram illustrating the general configuration of a main spindle device of a machine tool according to a third embodiment.

A main spindle device 1C of the third embodiment will be described below with reference to FIGS. 11 to 13. The main spindle device 1C of the third embodiment shown in FIG. 11 is different from the main spindle device 1 of the first embodiment shown in FIG. 1 in that the main spindle device 1C further includes a position detector 76 in a main spindle unit 2C. This difference will be mainly described below. The position detector 76 is a rod position detector (a position sensor, a proximity sensor, etc.) capable of detecting the position (axial position) of the rod 30 or a piston position sensor (a position sensor, a proximity sensor, etc.) capable of detecting the position (axial position) of the piston 45. The controller 80 receives a detection signal of the position detector 76 via a signal path Sps.

Figure 12:
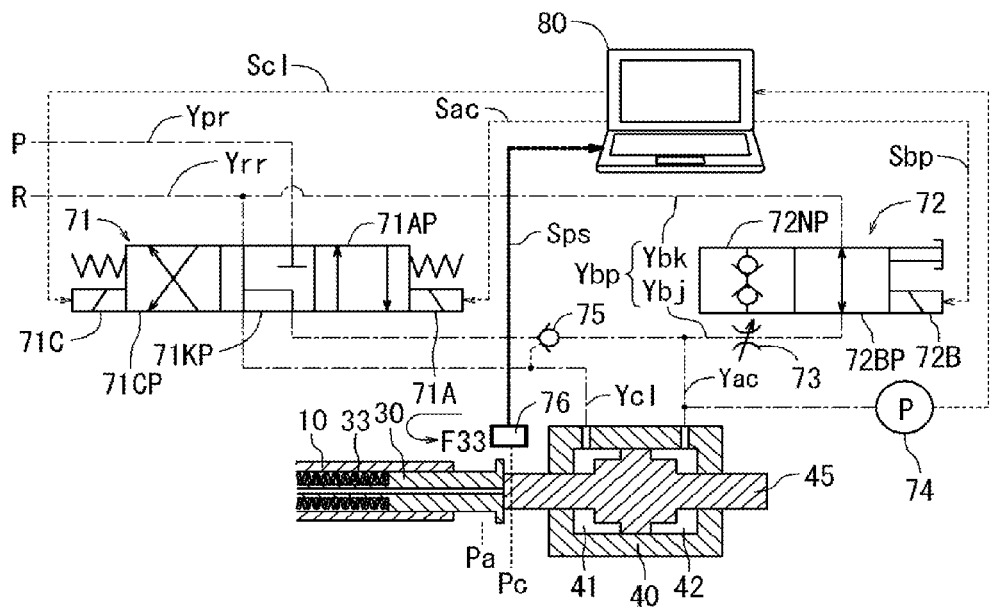
FIG. 12 is a diagram illustrating oil pressure paths and the positions of a rod and a piston at the time of measuring the biasing force of a biasing unit in the third embodiment.

FIG. 12 shows the state where the piston 45 is being gradually pressed back in the direction toward the second end by the biasing force from the rod 30 by switching the switch valve 71 and the bypass valve 72 as shown in FIG. 4 after moving the rod 30 to the unclamp position Pa by the piston 45 as shown in FIG. 3. The controller 80 can detect the timing the rod 30 has reached the clamp position Pc or the timing the piston 45 has reached the position corresponding to the clamp position Pc, based on the detection signal from the position detector 76. The controller 80 measures the biasing force F33 that biases the rod 30 from the unclamp position Pa toward the clamp position Pc. The controller 80 therefore measures a load in the return path of the load-deflection characteristics shown in FIG. 6.

Figure 13:
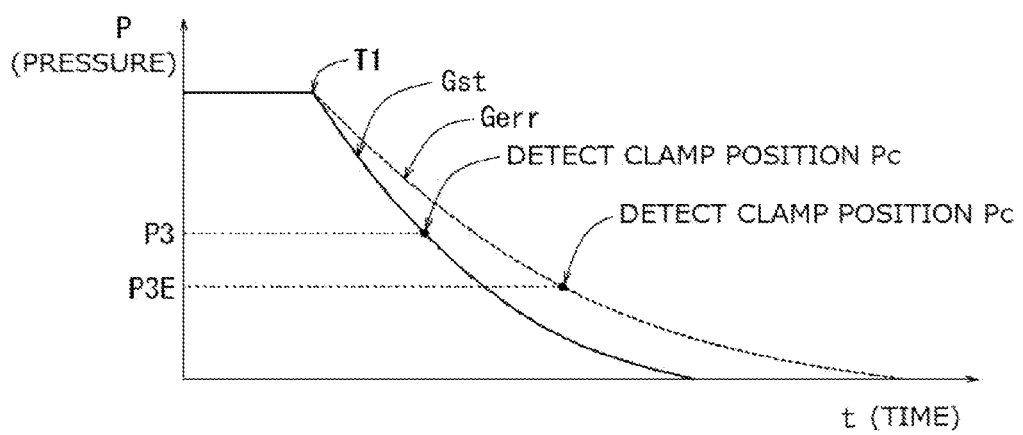
FIG. 13 is a diagram illustrating an example of measured pressures in the measurement of the biasing force of the biasing unit shown in FIG. 12.

Time-pressure characteristics of the third embodiment are as shown in the example of FIG. 13. In the third embodiment, as in the first embodiment, if the switch valve 71 and the bypass valve 72 are switched to the state shown in FIG. 12 at timing T1, the piston 45 is gradually pressed back in the direction toward the second end and the pressure gradually decreases. However, the third embodiment is different from the first embodiment in that the controller 80 can know the timing the rod 30 has reached the clamp position Pc (or the timing the piston 45 has reached the position corresponding to the clamp position Pc). The controller 80 obtains the biasing force based on the pressure at the timing the rod 30 has reached the clamp position Pc (or the timing the piston 45 has reached the position corresponding to the clamp position Pc) and the conversion information stored in the memory unit. For example, the area of the surface of the piston 45 which is subjected to the force of hydraulic oil in the unclamp chamber 42 in the direction toward the first end is stored as the conversion information. The controller 80 obtains the biasing force by multiplying the measured pressure and the area as the conversion information. In the example of FIG. 13, the disc springs whose biasing force has not decreased have characteristics Gst shown by a continuous line, and the measured pressure is a pressure P3. The disc springs whose biasing force has decreased have characteristics Gerr shown by a dashed line, and the measured pressure is a pressure P3E.

As described above, in the third embodiment, the controller 80 obtains the biasing force based on the pressure at the clamp position Pc, and thus obtains the load at the clamp position Pc in the return path of the load-deflection characteristics shown in FIG. 6. A very accurate biasing force can thus be obtained.

Figure 14:
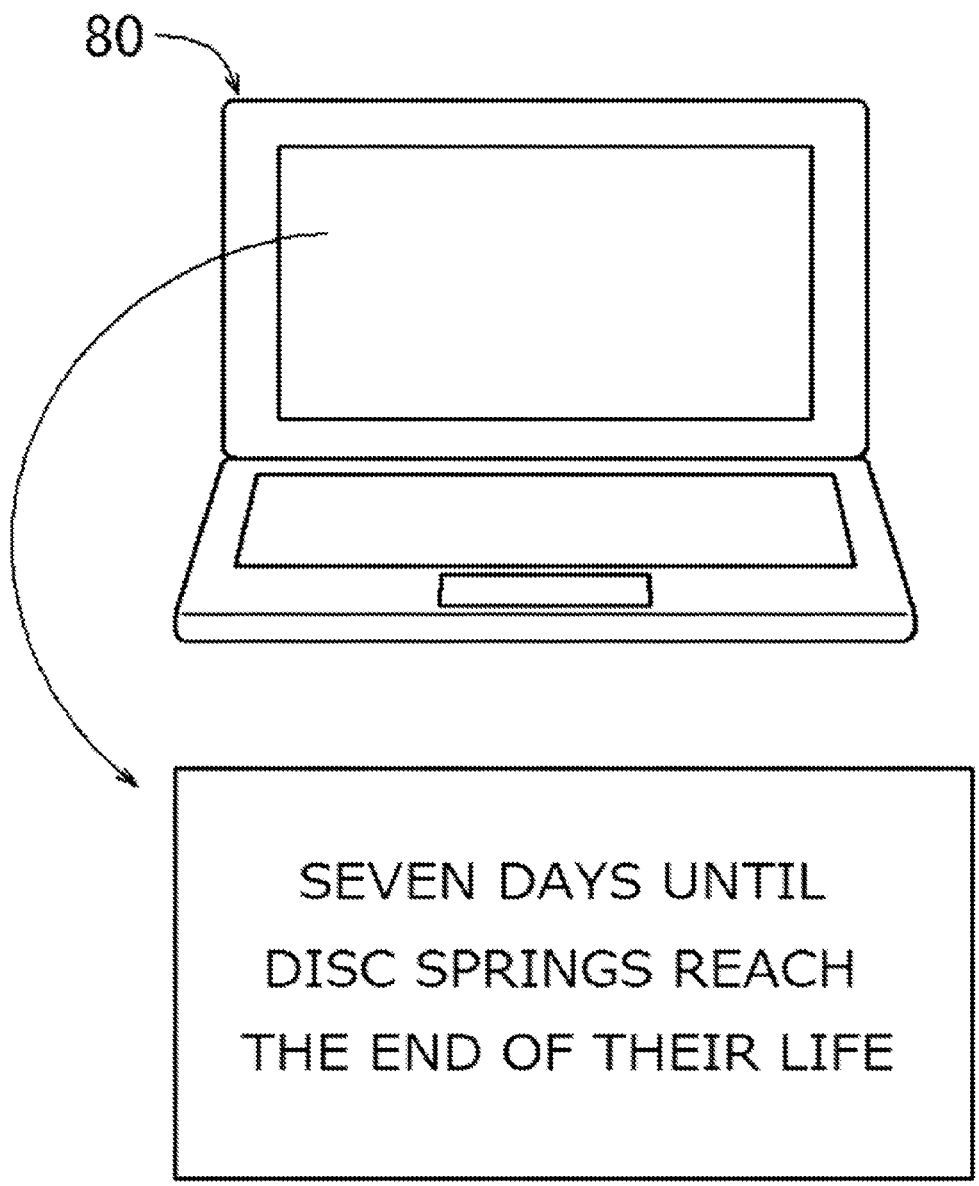
FIG. 14 is a diagram illustrating an example in which at least one of life of the biasing unit, time to replace the biasing unit, and abnormality of the biasing unit is displayed on a display unit.
Figure 15:
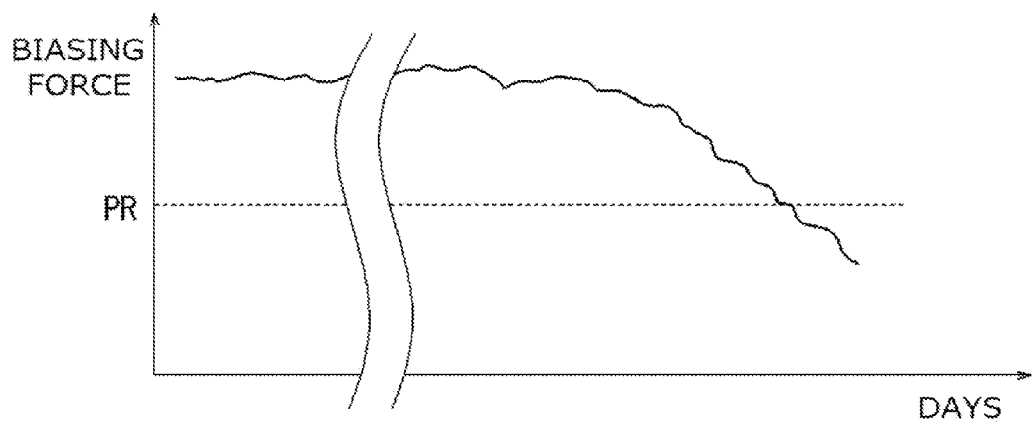
FIG. 15 is a diagram illustrating the life of the biasing unit.
Figure 16:
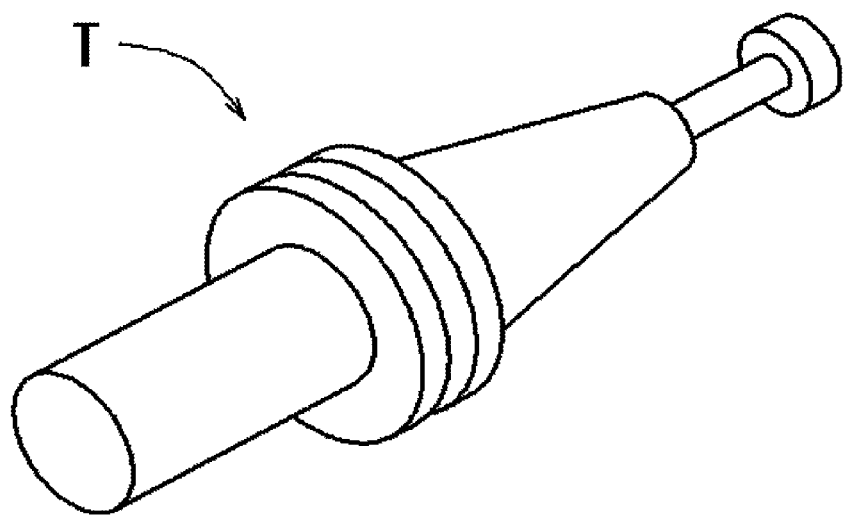
FIG. 16 is a diagram illustrating an example of appearance of a normal tool.
Figure 17:
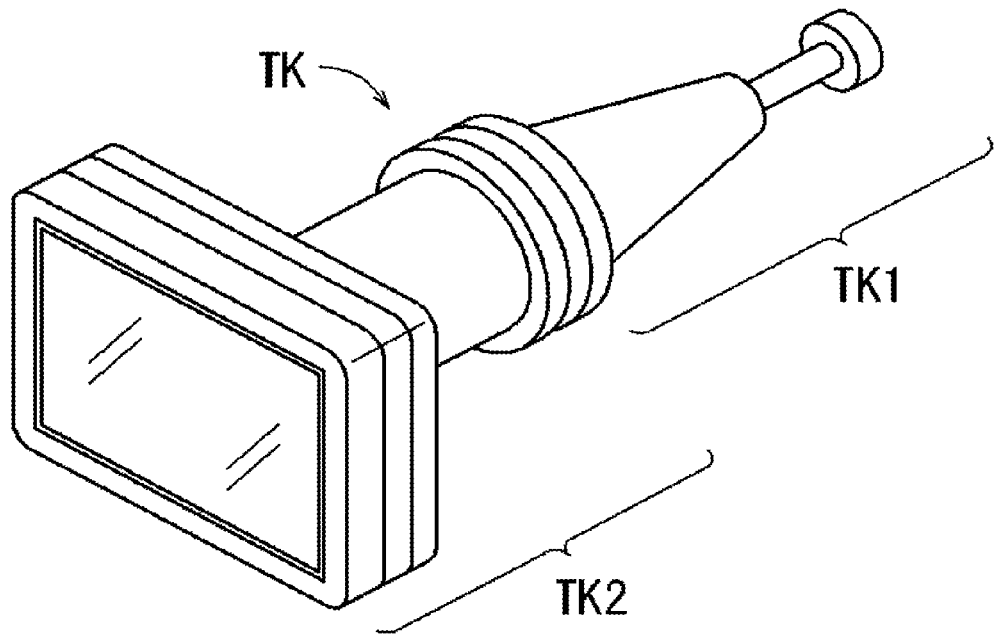
FIG. 17 is a diagram illustrating an example of appearance of a conventional clamping force measuring gauge.
Figure 18:
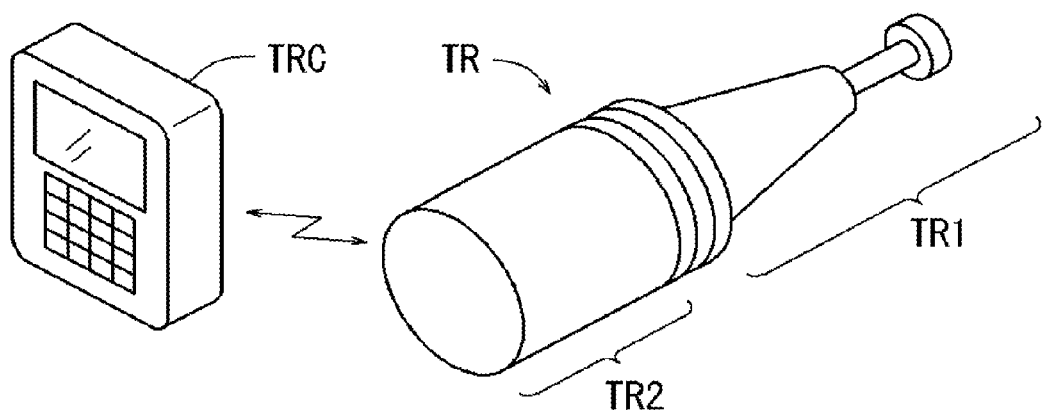
FIG. 18 is a diagram illustrating an example of appearance of a conventional clamping force measuring gauge.

An example of notification to the operator (FIG. 14) and an example of number of days-biasing force characteristics as life characteristics of the disc springs 33 (FIG. 15) will be described with reference to FIGS. 14 and 15. For example, the tool T is changed about several hundreds of times a day. Every time the tool T is changed, the rod 30 is moved to the unclamp position and the clamp position. A load is applied to the disc springs 33 as the rod 30 is moved. FIG. 15 shows the relationship between the number of days and the biasing force in the state where a load is applied to the disc springs 33. As shown in FIG. 15, new disc springs 33 have a substantially constant biasing force until the biasing force rapidly decreases at a certain point. For example, it takes about a week for the biasing force to reach a biasing force PR after the biasing force starts to decrease. The biasing force PR is a value used as an indication that it is time to replace the disc springs 33.

The controller 80 has a display unit (monitor) and measures the biasing force of the disc springs 33 at preset predetermined intervals (e.g., once in the morning of every operating day etc.) by using the configuration and the procedure which are described in any of the first to third embodiments. When the controller 80 detects that the biasing force has started to decrease, the controller 80 predicts the time the biasing force will reach the biasing force PR, i.e., the value used as an indication that it is time to replace the disc springs 33, based on the tendency of variation in biasing force (e.g., the tendency of variation in about the last ten measured biasing forces), and displays the life of the disc springs 33 on the display unit (see FIG. 14). The display unit may be integral with the controller 80 or may be a separate unit from the controller 80. Instead of displaying the life of the disc springs 33, the controller 80 may display time to replace the disc springs 33 or abnormality of the disc springs 33 (e.g., in the case where the biasing force has sharply decreased due to breakage etc. of the disc springs 33) on the display unit. The controller 80 displays on the display unit at least one of the life of the disc springs 33, the time to replace the disc springs 33, and the abnormality of the disc springs 33.

Such notification to the operator allows the operator to predict the sign of breakage of the disc springs and replace the disc springs before the disc springs suddenly break. This can avoid unexpected stop of the machine tool. The main spindle device of the present invention measures the biasing force of the disc springs in the return path of the characteristics with hysteresis (FIG. 6). Accordingly, the biasing force of the disc springs can be more accurately measured, and a maintenance cycle (replacement cycle) can be more accurately predicted.

The configuration, structure, appearance, processing procedure, etc. of the main spindle device of the machine tool according to the present invention can be modified, added, or eliminated. For example, the biasing unit is not limited to the disc springs.

What is claimed is:

1. A main spindle device of a machine tool, comprising:
   a main spindle supported so as to be rotatable relative to a housing and having a first end to which a tool is attached;
   a rod accommodated in the main spindle so as to be coaxial therewith and capable of reciprocating in an axial direction with respect to the main spindle, the rod being capable of moving to an unclamp position where the tool is released in a direction toward the first end, and when the main spindle is holding the tool, being capable of moving to a clamp position where the tool is clamped in a direction toward a second end of the spindle, which is an opposite direction to the direction toward the first end;
   a collet that is attached to a first end of the rod, that holds the tool when the rod moves in the direction toward the second end with respect to the main spindle, and that releases the tool when the rod moves in the direction toward the first end with respect to the main spindle;
   a biasing unit that biases the rod in the direction toward the second end with respect to the main spindle and that biases the rod to the clamp position when the collet is holding the tool;
   a biasing force detector configured to detect a biasing force of the biasing unit which biases the rod in the direction toward the second end, after the rod is moved in the direction toward the first end with respect to the main spindle to the unclamp position by a force larger than the biasing force of the biasing unit;

a supply path through which hydraulic oil having a predetermined pressure is supplied;

a discharge path through which the hydraulic oil is discharged;

a piston provided on a second end side with respect to the rod and capable of reciprocating in the axial direction with respect to the main spindle, the piston contacting a second end of the rod and moving the rod to the unclamp position by the force when the piston moves in the direction toward the first end with respect to the main spindle, and the piston being separated from the rod when the piston moves in the direction toward the second end with respect to the main spindle;

a cylinder accommodating the piston, and having an unclamp chamber that is filled with the hydraulic oil through the supply path when the piston moves in the direction toward the first end with respect to the main spindle, and a clamp chamber that is filled with hydraulic oil through the supply path when the piston moves in the direction toward the second end with respect to the main spindle;

an unclamp path connected to the unclamp chamber to serve as a path through which the unclamp chamber is filled with the hydraulic oil and the hydraulic oil in the unclamp chamber is discharged;

a clamp path connected to the clamp chamber to serve as a path through which the clamp chamber is filled with the hydraulic oil and the hydraulic oil in the clamp chamber is discharged;

a switch valve that switches a position to which the unclamp path is connected and a position to which the clamp path is connected;

a bypass path that connects the unclamp path and the discharge path or connects the unclamp chamber and the discharge path;

a bypass valve provided in the bypass path and having an open position where the bypass valve opens the bypass path and a close position where the bypass valve closes the bypass path;

a pressure detector capable of detecting at least one of a pressure of the hydraulic oil in the unclamp chamber, a pressure of the hydraulic oil in the unclamp path, and a pressure of the hydraulic oil in the bypass path;

a controller that controls the switch valve and the bypass valve to detect the pressure with the pressure detector; and a memory unit; wherein in response to a command to measure the biasing force of the biasing unit, the controller controls the switch valve and the bypass valve to move the piston in the direction toward the first end so as to move the rod to the unclamp position in the direction toward the first end by the force larger than the biasing force, then measures the pressure with the pressure detector while controlling the switch valve and the bypass valve to move the rod and the piston in the direction toward the second end by the biasing force of the biasing unit, and obtains the biasing force based on a time it takes for the measured pressure to decrease from a first predetermined pressure to a second predetermined pressure or a gradient as a pressure difference between the first predetermined pressure and the second predetermined pressure for the time it takes for the measured pressure to decrease from the first predetermined pressure to the second predetermined pressure, and conversion information stored in advance in the memory unit.

2. The main spindle device of the machine tool according to claim 1, wherein a first end of the bypass path is connected to a position on a path along which the piston moves, the position being a position that is located in the unclamp chamber formed when the rod is moved to the unclamp position in the direction toward the first end by the piston, that opens without interference from the piston when the rod is located at the unclamp position, and that is closed by the piston when the rod located at the unclamp position moves the piston in the direction toward the second end by the biasing force of the biasing unit and reaches the clamp position, the pressure detector can detect the pressure of the hydraulic oil in the unclamp chamber or the pressure of the hydraulic oil in the bypass path, and in response to a command to measure the biasing force of the biasing unit, the controller controls the switch valve and the bypass valve to move the piston in the direction toward the first end so as to move the rod to the unclamp position in the direction toward the first end by the force larger than the biasing force, then measures the pressure with the pressure detector while controlling the switch valve and the bypass valve to move the rod and the piston in the direction toward the second end by the biasing force of the biasing unit, and obtains the biasing force based on a substantially constant pressure detected by the pressure detector when the rod located at the unclamp position reaches the clamp position and the piston stops moving in the direction toward the second end, and the conversion information stored in advance in the memory unit, rather than obtaining the biasing force by measuring the time it takes for the measured pressure to decrease from the first predetermined pressure to the second predetermined pressure or the gradient as the pressure difference between the first predetermined pressure and the second predetermined pressure for the time it takes for the measured pressure to decrease from the first predetermined pressure to the second predetermined pressure.

3. A main spindle device of a machine tool, comprising:

a main spindle supported so as to be rotatable relative to a housing and having a first end to which a tool is attached;

a rod accommodated in the main spindle so as to be coaxial therewith and capable of reciprocating in an axial direction with respect to the main spindle, the rod being capable of moving to an unclamp position where the tool is released in a direction toward the first end, and when the main spindle is holding the tool, being capable of moving to a clamp position where the tool is clamped in a direction toward a second end of the spindle, which is an opposite direction to the direction toward the first end;

a collet that is attached to a first end of the rod, that holds the tool when the rod moves in the direction toward the second end with respect to the main spindle, and that releases the tool when the rod moves in the direction toward the first end with respect to the main spindle;

a biasing unit that biases the rod in the direction toward the second end with respect to the main spindle and that biases the rod to the clamp position when the collet is holding the tool;

a biasing force detector configured to detect a biasing force of the biasing unit which biases the rod in the direction toward the second end, after the rod is moved in the direction toward the first end with respect to the main spindle to the unclamp position by a force larger than the biasing force of the biasing unit;

a rod position detector capable of detecting a position of the rod or a piston position detector capable of detecting a position of a piston;

a supply path through which hydraulic oil having a predetermined pressure is supplied;

a discharge path through which the hydraulic oil is discharged;

the piston provided on a second end side with respect to the rod and capable of reciprocating in the axial direction with respect to the main spindle, the piston contacting a second end of the rod and moving the rod to the unclamp position by the force when the piston moves in the direction toward the first end with respect to the main spindle, and the piston being separated from the rod when the piston moves in the direction toward the second end with respect to the main spindle;

a cylinder accommodating the piston, and having an unclamp chamber that is filled with the hydraulic oil through the supply path when the piston moves in the direction toward the first end with respect to the main spindle, and a clamp chamber that is filled with the hydraulic oil through the supply path when the piston moves in the direction toward the second end with respect to the main spindle;

an unclamp path connected to the unclamp chamber to serve as a path through which the unclamp chamber is filled with the hydraulic oil and the hydraulic oil in the unclamp chamber is discharged;

a clamp path connected to the clamp chamber to serve as a path through which the clamp chamber is filled with the hydraulic oil and the hydraulic oil in the clamp chamber is discharged;

a switch valve that switches a position to which the unclamp path is connected and a position to which the clamp path is connected;

a bypass path that connects the unclamp path and the discharge path or connects the unclamp chamber and the discharge path;

a bypass valve provided in the bypass path and having an open position where the bypass valve opens the bypass path and a close position where the bypass valve closes the bypass path;

a pressure detector capable of detecting at least one of a pressure of the hydraulic oil in the unclamp chamber, a pressure of the hydraulic oil in the unclamp path, and a pressure of the hydraulic oil in the bypass path;

a controller that controls the switch valve and the bypass valve to detect the pressure with the pressure detector; and a memory unit; wherein in response to a command to measure the biasing force of the biasing unit, the controller controls the switch valve and the bypass valve to move the piston in the direction toward the first end so as to move the rod to the unclamp position in the direction toward the first end by the force larger than the biasing force, then measures the pressure with the pressure detector while controlling the switch valve and the bypass valve to move the rod and the piston in the direction toward the second end by the biasing force of the biasing unit and measures the position of the rod with the rod position detector or measures the position of the piston with the piston position detector, and obtains the biasing force based on the pressure detected by the pressure detector and conversion information stored in advance in the memory unit when the rod reaches the clamp position or the piston reaches a position corresponding to the clamp position.

4. The main spindle device of the machine tool according to claim 1, wherein
a throttle that adjusts a flow rate of the hydraulic oil is provided in the bypass path.

5. The main spindle device of the machine tool according to claim 1, wherein
a pilot check valve is provided in the unclamp path, and the pilot check valve opens the unclamp path when the pressure of the hydraulic oil in the clamp path is equal to or higher than a predetermined pressure, and inhibits discharge of the hydraulic oil from the unclamp chamber and allows the hydraulic oil to flow into the unclamp chamber when the pressure of the hydraulic oil in the clamp path is lower than the predetermined pressure.

6. The main spindle device of the machine tool according to claim 1, further comprising:
a display unit; wherein
the biasing force is obtained at preset predetermined intervals, and
at least one of an abnormality of the biasing unit, a life of the biasing unit, and a time to replace the biasing unit is obtained based on tendency of variation in the obtained biasing force and is displayed on the display unit.

7. A main spindle device of a machine tool, comprising:
a main spindle supported so as to be rotatable relative to a housing and having a first end to which a tool is attached;
a rod accommodated in the main spindle so as to be coaxial therewith and capable of reciprocating in an axial direction with respect to the main spindle, the rod being capable of moving to an unclamp position where the tool is released in a direction toward the first end, and when the main spindle is holding the tool, being capable of moving to a clamp position where the tool is clamped in a direction toward a second end of the spindle, which is an opposite direction to the direction toward the first end;
a collet that is attached to a first end of the rod, that holds the tool when the rod moves in the direction toward the second end with respect to the main spindle, and that releases the tool when the rod moves in the direction toward the first end with respect to the main spindle;
a biasing unit that biases the rod in the direction toward the second end with respect to the main spindle and that biases the rod to the clamp position when the collet is holding the tool; and
a biasing force detector that detects a biasing force of the biasing unit which biases the rod in the direction toward the second end, the biasing force detector comprising
means for moving the rod in the direction toward the first end with respect to the main spindle to the unclamp position by a force larger than the biasing force of the biasing unit, and
means for determining the biasing force of the biasing unit at a time after the rod is moved in the direction toward the first end with respect to the main spindle to the unclamp position by force larger than the biasing force of the biasing unit, and after the rod has begun to move from the unclamp position in the direction toward the second end with respect to the main spindle.

8. The main spindle device of the machine tool according to claim 7, further comprising:
a display unit; wherein
the biasing force is obtained at preset predetermined intervals, and
at least one of an abnormality of the biasing unit, a life of the biasing unit, and a time to replace the biasing unit is obtained based on tendency of variation in the obtained biasing force and is displayed on the display unit.

* * * * *